United States Patent
Bowyer et al.

(10) Patent No.: US 9,188,104 B2
(45) Date of Patent: Nov. 17, 2015

(54) SYSTEM AND METHOD FOR CONTROLLING POWER OUTPUT FROM A WIND TURBINE OR WIND POWER PLANT

(75) Inventors: Robert Bowyer, London (GB); Christopher Palmer, Effingham (GB); Chris Spruce, Leatherhead (GB)

(73) Assignee: Vestas Wind Systems A/S, Aarhus N (DK)

( * ) Notice: Subject to any disclaimer, the term of this patent is extended or adjusted under 35 U.S.C. 154(b) by 35 days.

(21) Appl. No.: 14/126,186

(22) PCT Filed: Jun. 26, 2012

(86) PCT No.: PCT/DK2012/050212
§ 371 (c)(1),
(2), (4) Date: Feb. 24, 2014

(87) PCT Pub. No.: WO2013/000468
PCT Pub. Date: Jan. 3, 2013

(65) Prior Publication Data
US 2014/0203563 A1 Jul. 24, 2014

Related U.S. Application Data

(60) Provisional application No. 61/502,898, filed on Jun. 30, 2011.

(30) Foreign Application Priority Data

Jun. 30, 2011 (DK) .................................. 2011 70343

(51) Int. Cl.
*F03D 9/00* (2006.01)
*H02P 9/04* (2006.01)
(Continued)

(52) U.S. Cl.
CPC ............ *F03D 7/0268* (2013.01); *F03D 7/0284* (2013.01); *F03D 7/0288* (2013.01); *F03D 7/047* (2013.01); *F05B 2270/1033* (2013.01); *F05B 2270/1075* (2013.01); *Y02E 10/723* (2013.01)

(58) Field of Classification Search
USPC ............................ 290/44, 55; 416/1; 700/287
See application file for complete search history.

(56) References Cited

U.S. PATENT DOCUMENTS 4,975,238 A * 12/1990 Regan et al. ................... 376/216
6,250,877 B1 * 6/2001 Westphal et al. ............... 415/17
(Continued)

FOREIGN PATENT DOCUMENTS

DE 102009027981 A1 1/2011
EP 1770278 A2 4/2007
(Continued)

OTHER PUBLICATIONS

International Search Report; PCT/DK2012/050212; Sep. 7, 2012.
(Continued)

*Primary Examiner* — Pedro J Cuevas
(74) *Attorney, Agent, or Firm* — Patterson & Sheridan, LLP

(57) ABSTRACT

A LIDAR or other remote sensing apparatus is mounted on a wind turbine to sense one or more wind parameters. An extreme event detector processing signals from the LIDAR to determine whether a given sensed parameter will, when it arrives at the turbine, exceed a predetermined value and represent an extreme event. On detection of an extreme event, the detector outputs an extreme event signal to a controller. The controller controls overrating of the turbine in response to a variety of sensed parameters and selectively operates the turbine at above rated wind speed. On receipt of the extreme event signal the overrating is overridden to prevent damage to turbine components. The controller may be a power plant controller and the override signal may override only overrating at the turbine which has detected the extreme event, or a plurality of turbines.

15 Claims, 8 Drawing Sheets

(51) Int. Cl.
  *F03D 7/02*  (2006.01)
  *F03D 7/04*  (2006.01)
  *B64C 11/00* (2006.01)

(56) References Cited

U.S. PATENT DOCUMENTS

| | | | |
|---|---|---|---|
| 8,049,352 B2 * | 11/2011 | Jorgensen et al. | 290/44 |
| 8,123,477 B2 * | 2/2012 | Risager et al. | 416/1 |
| 8,478,448 B2 * | 7/2013 | Krueger | 700/286 |
| 8,901,763 B2 * | 12/2014 | Bowyer et al. | 290/44 |
| 8,907,511 B2 * | 12/2014 | Bowyer et al. | 290/44 |
| 8,928,164 B2 * | 1/2015 | Bowyer et al. | 290/44 |
| 2006/0273595 A1 | 12/2006 | Avagliano et al. | 290/44 |
| 2007/0067067 A1 | 3/2007 | Stommel | 700/287 |
| 2010/0217550 A1 * | 8/2010 | Crabtree et al. | 702/62 |
| 2010/0217651 A1 * | 8/2010 | Crabtree et al. | 705/10 |
| 2010/0283247 A1 * | 11/2010 | Krueger | 290/44 |
| 2010/0308585 A1 * | 12/2010 | Jorgensen et al. | 290/44 |
| 2011/0031748 A1 | 2/2011 | Arinaga et al. | 290/44 |
| 2012/0134802 A1 | 5/2012 | Westergaard et al. | 416/1 |
| 2013/0009403 A1 * | 1/2013 | Cornelius | 290/55 |
| 2013/0033040 A1 * | 2/2013 | Bowyer et al. | 290/44 |
| 2013/0035798 A1 * | 2/2013 | Zhou et al. | 700/287 |
| 2013/0094960 A1 * | 4/2013 | Bowyer et al. | 416/1 |
| 2013/0094961 A1 * | 4/2013 | Couchman et al. | 416/1 |
| 2013/0099497 A1 * | 4/2013 | Bowyer et al. | 290/44 |
| 2013/0103202 A1 * | 4/2013 | Bowyer et al. | 700/275 |
| 2013/0129508 A1 * | 5/2013 | Spruce | 416/1 |
| 2013/0134711 A1 * | 5/2013 | Spruce | 290/44 |
| 2013/0257051 A1 * | 10/2013 | Spruce et al. | 290/44 |
| 2013/0270827 A1 * | 10/2013 | Couchman et al. | 290/44 |
| 2014/0035285 A1 * | 2/2014 | Creaby et al. | 290/44 |
| 2014/0070538 A1 * | 3/2014 | Bowyer et al. | 290/44 |
| 2014/0140843 A1 * | 5/2014 | Spruce et al. | 416/1 |
| 2014/0248123 A1 * | 9/2014 | Turner et al. | 415/1 |
| 2014/0297206 A1 * | 10/2014 | Silverman | 702/58 |
| 2015/0094968 A1 * | 4/2015 | Jia et al. | 702/60 |

FOREIGN PATENT DOCUMENTS

| | | |
|---|---|---|
| GB | 2476506 A | 6/2011 |
| WO | 2010/086032 A2 | 8/2010 |
| WO | 2010/108910 A2 | 9/2010 |
| WO | 2011/000531 A2 | 1/2011 |
| WO | 2011/008637 A2 | 1/2011 |
| WO | 2011/022024 A1 | 2/2011 |

OTHER PUBLICATIONS

DK Search Report; PA201170343; Feb. 10, 2012.

* cited by examiner

SYSTEM AND METHOD FOR CONTROLLING POWER OUTPUT FROM A WIND TURBINE OR WIND POWER PLANT

FIELD OF THE INVENTION

This invention relates to wind turbines and more specifically to operation of a wind turbine to control the amount of energy extracted from the wind under given wind conditions. It is also relevant to wind power plants comprising a plurality of wind turbines.

BACKGROUND TO THE INVENTION

When selecting a wind turbine for a given operating location, consideration is given to characteristics of the site such as the complexities of the site terrain and the average wind conditions. The turbines chosen can ideally operate at rated power for as much of the time as possible. However, in practice, wind speeds are variable and the turbine must be able to cope with a wide variety of wind speeds. At lower wind speeds the power output will either be zero, if there is negligible wind, or below rated power. Once the wind speed increases to above that required for generation of rated power, the turbine will protect itself from damage, for example, by varying the pitch of the blades to reduce the power extracted from the wind. In extreme cases the turbine may shut down or yaw out of the wind to prevent catastrophic damage. However, an emergency shutdown or yaw procedure takes time and, in some circumstances may not be able to prevent severe damage to turbine components from occurring.

Our pending application GB 1016493 entitled "Over-Rating Control in Wind Turbines and Wind Power Plants" describes how a turbine, or group of turbines, may be over-rated in response to a request for more power. The term 'over-rating' entails extraction of power from the turbine at a level that is greater than rated power. Over-rating may be used for a number of reasons, including in response to a demand from the grid operator which may require a sudden injection of power in response to a grid fault. It is also known to over-rate to take advantage of economic conditions, such as the value of generated electricity at a given time.

We have appreciated that it is desirable to over-rate a turbine when conditions permit. It is possible to monitor parameters which can affect the fatigue life of a turbine, such as turbulence, and only over-rate a turbine when the effect on fatigue life is likely to be low. Thus, a turbine may be operated at above rated power if the wind is considered to be coherent with little turbulence.

One factor which has affected the implementation of over-rating is the risk of an extreme event arriving at a turbine that is operating in an over-rated mode. When a turbine is over-rated, operating loads are very high and an extreme event carries a high likelihood of causing serious damage. Extreme events are defined by International Standard IEC 64100-1, $3^{rd}$ Edition at Section 6.3.2. Extreme events are conditions which may occur very infrequently, for example, once every year or once every few years, but individually, have the potential to cause serious damage to the wind turbine or individual turbine components. IEC 64100-1 defines a number of extreme events including an extreme operating gust, extreme turbulence, extreme shear and extreme change of direction. Wind turbines are designed to be able to withstand these extreme events and are therefore, effectively, over engineered for operation under normal load conditions.

It is therefore desirable to be able to detect extreme events and to prevent a wind turbine from operating in an over-rating mode when an extreme event is likely to occur. The present invention aims to address this requirement.

SUMMARY OF THE INVENTION

According to a first aspect of the invention there is provided a wind turbine, comprising a remote sensing apparatus for sensing a wind parameter at a location remote from the wind turbine, a processor for processing the sensed wind parameter and outputting an override signal if the processing indicates that the wind parameter will exceed a predetermined value when it arrives at the wind turbine, and a controller for controlling the output power of the wind turbine, the controller being configured to command the turbine, in response to sensed parameters, to overrate the turbine by operating the turbine at an output power greater than the rated power of the turbine, wherein the controller is further configured to receive the override signal from the processor and, on receipt of the override signal, to prevent or reduce overrating of the turbine.

This aspect of the invention also resides in a control system for a wind turbine, comprising a remote sensing apparatus for sensing a wind parameter at a location remote from the wind turbine, a processor for processing the sensed wind parameter and outputting an override signal if the processing indicates that the wind parameter will exceed a predetermined value when it arrives at the wind turbine, and a controller for controlling the output power of the wind turbine, the controller being configured to command the turbine, in response to sensed parameters, to overrate the turbine by operating the turbine at an output power greater that the rated power of the turbine, wherein the controller is further configured to receive the override signal from the processor and, on receipt of the override signal, to prevent or reduce overrating of the turbine.

This aspect of the invention also provides a method of controlling a wind turbine comprising sensing a wind parameter at a location remote from the wind turbine, processing the sensed wind parameter and outputting an override signal if the processing indicates that the wind parameter will exceed a predetermined value when it arrives at the wind turbine, and controlling the output power of the wind turbine using a controller configured to command the turbine, in response to sensed parameters, to overrate the turbine by operating the turbine at an output power greater that the rated power of the turbine, the controller receiving the override signal from the processor and, on receipt of the override signal, preventing or reducing overrating of the turbine.

A second aspect of the invention provides a wind power plant comprising a plurality of wind turbines, a remote sensing apparatus for sensing a wind parameter at a location remote from the wind power plant, a processor for processing the sensed wind parameter and outputting an override signal if the processing indicates that the wind parameter will exceed a predetermined value when it arrives at the wind power plant, and a controller for controlling the power output of the plurality of wind turbines, the controller being configured to command at least some of the turbines, in response to sensed parameters, to overrate the turbines by operating the turbines at an output power greater than the rated power of the turbines, wherein the controller is further configured to receive the override signal from the processor and, on receipt of the override signal, to prevent or reduce overrating.

The second aspect of the invention also provides a control system for a wind power plant comprising a plurality of wind turbines, comprising a remote sensing apparatus for sensing a wind parameter at a location remote from the wind power plant, a processor for processing the sensed wind parameter and outputting an override signal if the processing indicates that the wind parameter will exceed a predetermined value when it arrives at the wind power plant, and a controller for controlling the power output of the plurality of wind turbines, the controller being configured to command at least some of the turbines, in response to sensed parameters, to overrate the turbines by operating the turbines at an output power greater than the rated power of the turbines, wherein the controller is further configured to receive the override signal from the processor and, on receipt of the override signal, to prevent or reduce overrating.

The second aspect of the invention further provides a method of controlling a wind power plant comprising a plurality of wind turbines, comprising sensing, using a remote sensing apparatus mounted on one of the plurality of wind turbines, a wind parameter at a location remote from the wind turbine, processing the sensed wind parameter and outputting an override signal if the processing indicates that the wind parameter will exceed a predetermined value when it arrives at the wind turbine, controlling the power output of the plurality of wind turbines using a controller configured to command at least some of the turbines, in response to sensed parameters, to overrate the turbines by operating the turbines at an output power greater than the rated power of the turbines, wherein the controller receives the override signal from the processor and, on receipt of the override signal, prevents or reduces overrating.

In an embodiment, the remote sensing apparatus senses a plurality of wind parameters. This enables a plurality of extreme events to be detected. Possible parameters include one or more of wind speed, wind turbulence, wind direction, vertical wind shear and horizontal wind shear.

In an embodiment, the remote sensing apparatus is a LIDAR (Light Detection And Ranging) device. The LIDAR device may be mounted on the turbine to sense a wind parameter generally upstream of the wind turbine or may be mounted to scan around a generally vertical axis to sense a wind parameter at a position remote from the wind turbine at any direction with respect to the wind turbine.

In an embodiment, the processor outputs the override signal if the processing indicates that the wind parameter will represent an extreme event as defined by IEC 64100-1 when it arrives at the wind turbine.

In one embodiment of the second aspect of the invention, on receipt of the override signal, the controller can prevent overrating only at the wind turbine from which the override signal was received or may further prevents overrating at one or more further wind turbines of the plurality of wind turbines.

Embodiments of the various aspects of the invention have the advantage that by coupling an overrating controller to an extreme event detector, and overriding overrating when an extreme event is detected, overrating may be performed with confidence as the risk of damage caused by an extreme event arriving at the turbine while it is overrated is removed.

BRIEF DESCRIPTION OF DRAWINGS

Embodiments of the invention will now be described, with reference to the accompanying drawings, in which.

DETAILED DESCRIPTION OF THE EMBODIMENTS

Figure 1:
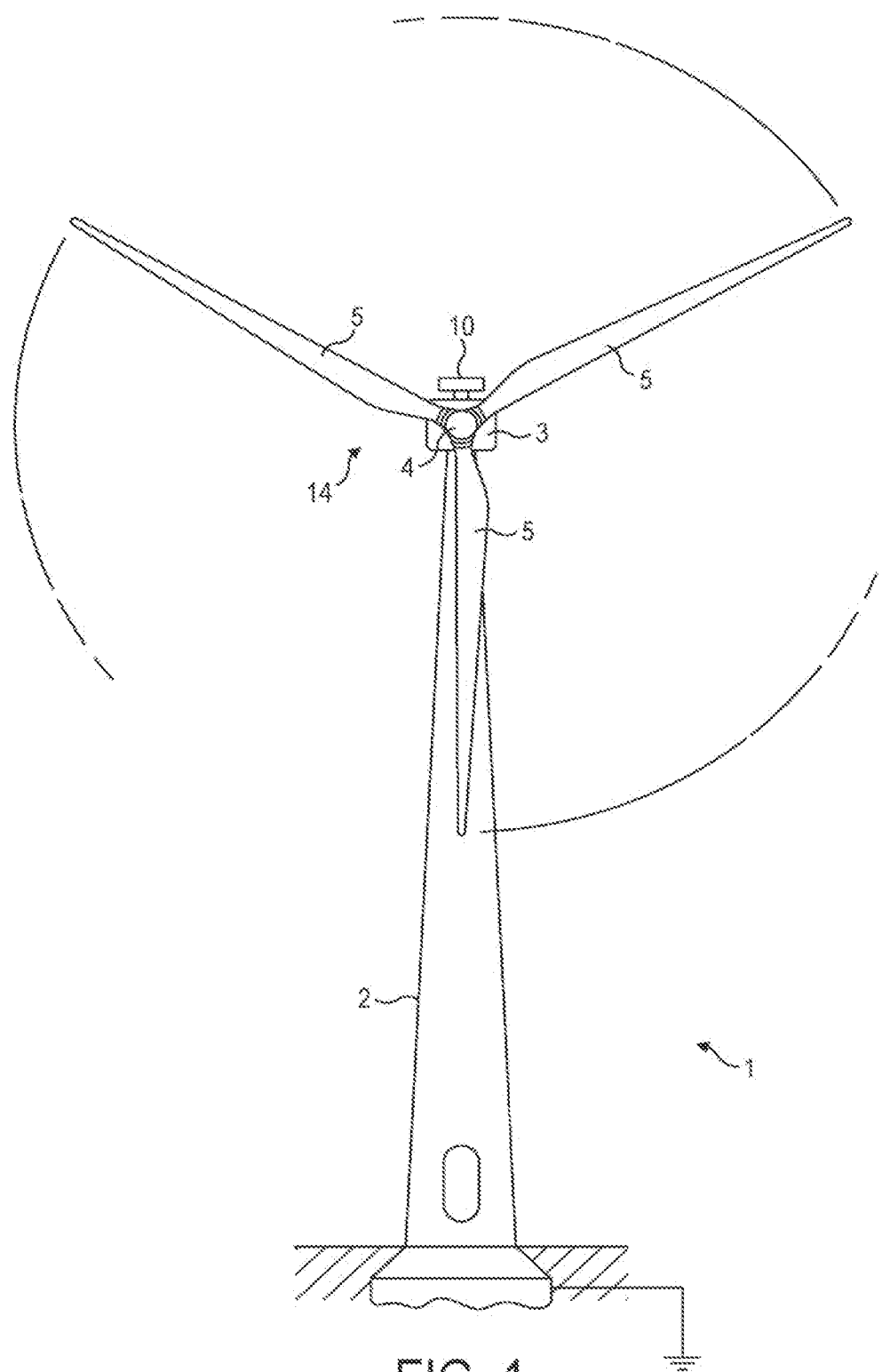
FIG. 1 is a schematic diagram of a wind turbine having a remote sensor for detecting advanced wind conditions.
Figure 2:
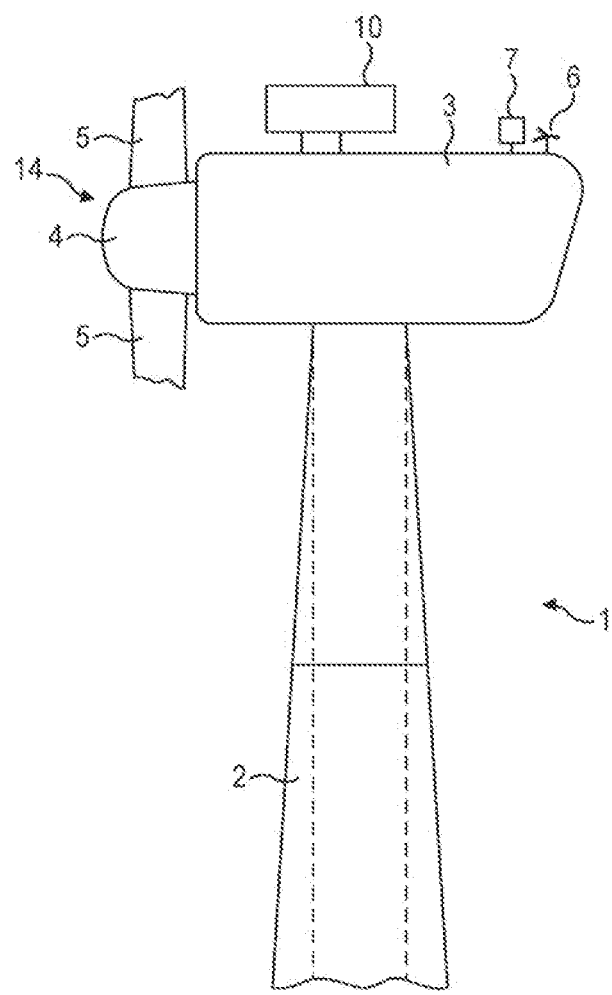
FIG. 2 is a partial side view of the turbine of FIG. 1.

FIGS. 1 and 2 illustrate a wind turbine 1 embodying the invention which comprises a tower 2, a nacelle 3 which houses a generator (not shown) and a rotor 14 carrying three rotor blades 5. Part of the tower and part of the blades are omitted in FIG. 2 for the sake of clarity. A spinner 4 is mounted on the rotor hub and a cup anemometer 6 and an ultrasonic wind sensor 7 are arranged on the upper surface of the nacelle. Although most commercial wind turbine rotors have three blades, the number of blades may be different.

A remote sensing device 10 is also mounted on the wind turbine. The sensing device senses one or more properties of the wind at a position in front of, or upwind of the wind turbine. The sensing device may be a simple wind speed measuring device, but a possible device is a LIDAR (Light, Detection and Ranging) device although other devices such as SODAR may be used. In the following description, a LIDAR is used as the device. In some more simply embodiments an anemometer device may be used.

The LIDAR is shown in FIGS. 1 and 2 as being mounted on the upper surface of the nacelle, but its position may vary. For example, it may be mounted on the tower, on the underside of the nacelle, in the spinner or even in the blades. In the latter case, a separate LIDAR may be mounted on each blade or a single LIDAR in only one or two of the blades. A blade may have more than one LIDAR.

The type of LIDAR used will depend on the nature of extreme events it is desired to detect. A multi-beam LIDAR may be used in order to detect components of wind velocity in two or three directions, enabling turbulence, extreme direction change or extreme gusts to be detected. A simpler LIDAR may only be able to detect extreme wind speeds. Generally, the LIDAR will sense conditions within a cone having its axis along the axis of rotation of the rotor hub. However, a simple scanning LIDAR may be used which rotates about a vertical axis to provide a 360° sweep around the wind turbine. As an alternative two 180° scans could be produced. Such an arrangement is simple and enables events to be detected that are beside or behind a wind turbine.

LIDAR operates by emitting a laser beam in front of the wind turbine to measure conditions a distance in front of the turbine. The LIDAR operates in a known manner, either by detecting air molecules or by detecting particles entrained in the airstream and calculating information about the airflow from these measurements. Based on the calculated wind parameters, operational parameters of the wind turbine may be controlled to optimise the amount of energy that can be extracted from the wind.

Figure 3:
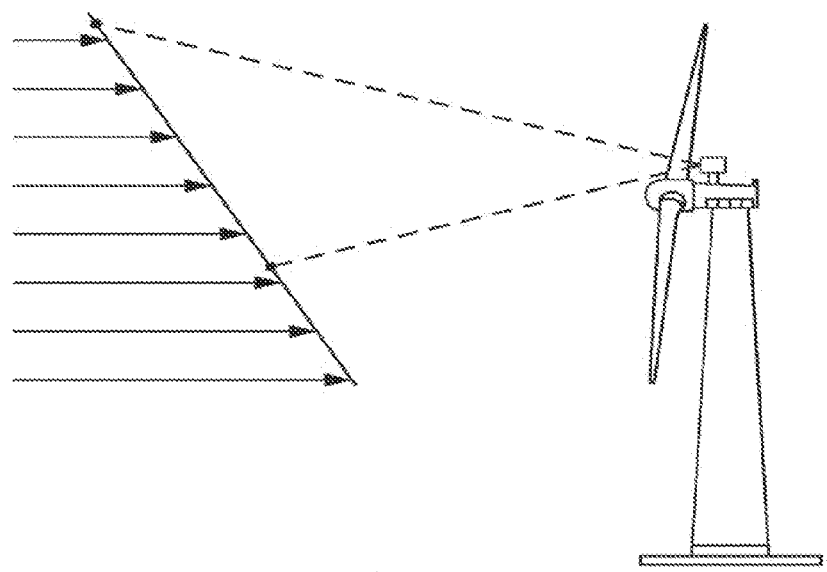
FIG. 3 shows how the remote sensor may be used to measure negative vertical wind shear.
Figure 4:
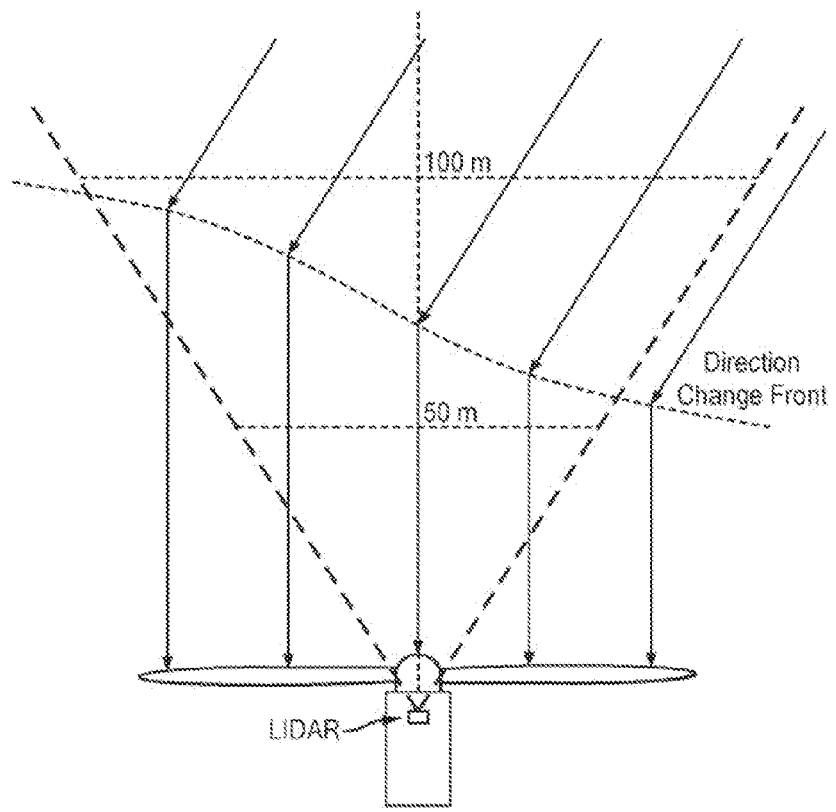
FIG. 4 shows how the remote sensor may be used to measure extreme direction change.
Figure 5:
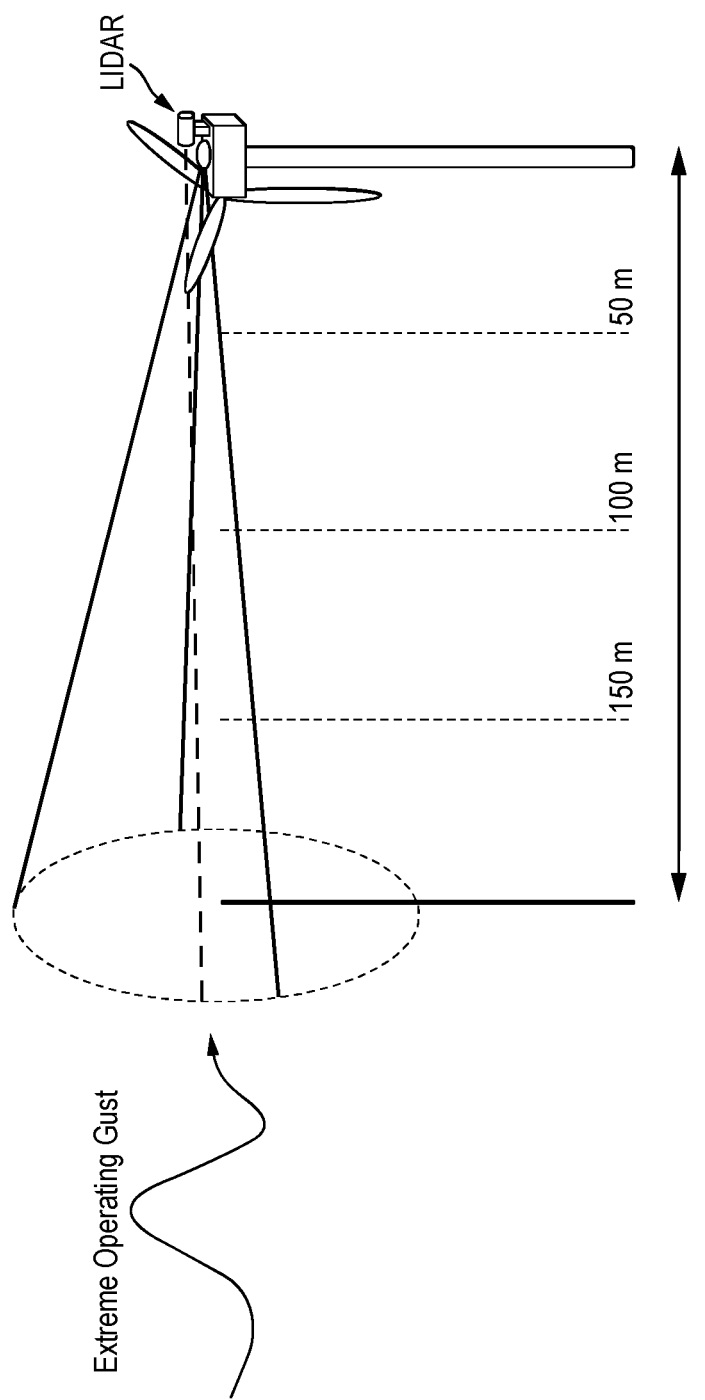
FIG. 5 shows how the remote sensor may be used to measure an extreme operating gust.

FIGS. 3-5 show three extreme events which may be detected by the LIDAR. FIG. 3 shows an extreme negative vertical wind shear where the wind velocity increases rapidly in the vertical direction from the top of the rotor hub to the bottom. FIG. 4 shows how extreme direction change may occur. In FIG. 4, the LIDAR is a multiple range gate LIDAR which can detect wind conditions at multiple distances. In FIG. 4, the direction of the wind front changes between two measurement ranges at 100 meters and 50 meters from the turbine. By measuring the wind parameters at both of these distances, the controller can determine that an extreme directional change is about to arrive at the turbine and make suitable adjustments to the turbines operating parameters. In FIG. 5, an extreme operating gust is detected.

Figure 6:
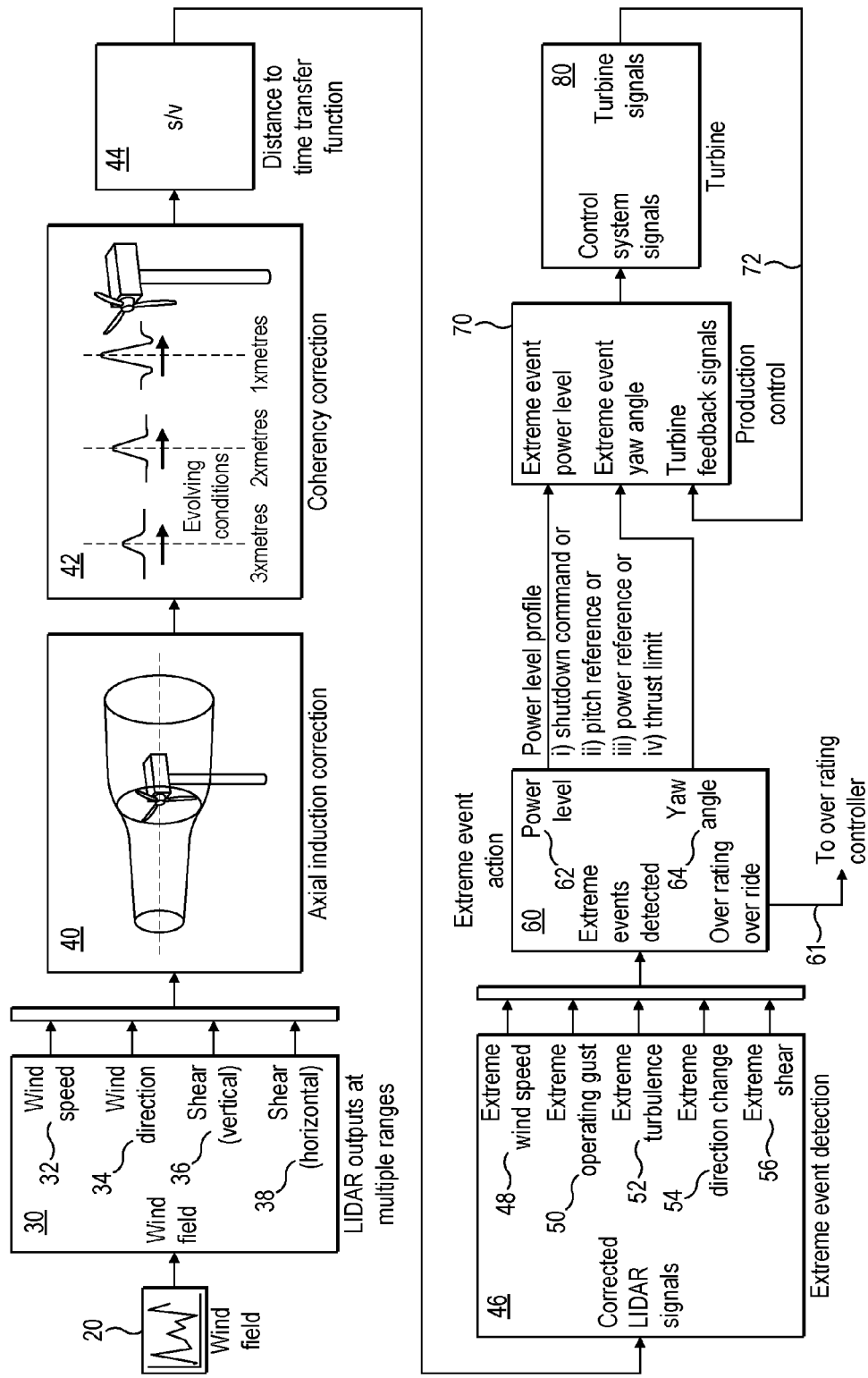
FIG. 6 is a schematic diagram showing how an extreme event detector can be integrated into an over-rating controller.

In response to a detected extreme event, the wind turbine may undergo an emergency shut down or "duck under" the wind so that the gust does not damage the turbine. This may be achieved by pitching the blades to an extreme position such that loading of the blades is minimised and additionally, or alternatively, undergoing a rapid yaw to move the rotor out of the wind. In the case of an extreme direction change, the rotor may be yawed such that the rotor is normal to the new direction. As shown in FIG. 6, the LIDAR detects an extreme coherent gust at approximately 0.5-3 rotor diameters upstream of the rotor. For a 100 m diameter rotor, this is about 50-300 m and for a 30 m/s gust equates to 1.6-10 s advance warning of the gust. This distance is not fixed, but needs to be sufficiently far in front of the wind turbine to enable the turbine to take evasive action when required. The limit of the distance will be governed by the power and quality of the LIDAR. In some embodiments of the invention, which use a LIDAR scanning around a vertical axis, the detection will not be in front of the LIDAR but will still be sufficiently distant to enable evasive action to be taken. In the simple case of coherent gust detection, the LIDAR may be a simple staring type unit having a single laser measurement unit which sends a single laser beam upstream of the turbine. However, a plurality of laser measurement units may be used, for example, with the majority voting to detect an extreme gust. This redundancy is desirable as the detection of an extreme event is a safety critical event and the redundancy guards against failure of one or more of the laser measurement units. For the same reason the laser measurement units may each have their own physically separate power supply lines to different power supply sources within the turbine. If individual power supplies are not provided, then at least two supplies should be present.

As explained above, although a simple staring type laser unit can detect a coherent gust, it a multi-beam unit may be used which can detect a wider range of extreme events.

The effect of the user of LIDAR is to enable extreme loading of the turbine components caused by extreme gusts to be avoided. The turbine controller will adjust operating parameters of the turbine to avoid the extreme loading caused by extreme events. These parameters will include disabling over-rating until the extreme event has passed so avoiding the potentially catastrophic loading that would occur if the turbine was operating in an over-rating mode when an extreme event arrived. This has the advantage of making over-rating safe to implement under more normal operating conditions. It further has the advantage that turbine components do not need to be designed to withstand as high loads as at present and may be made more lightweight or larger to increase energy capture at lower wind speeds whilst still meeting the requirements of IEC 64100-1.

When the LIDAR detects that the extreme gusts is not sufficiently severe to require a total shutdown, the controller may reduce the rotational speed of the rotor and reduce torque via a generator current demand signal in advance of the gust reaching the rotor. This of course, will cause the turbine to stop over-rating. This may be preferred to a total shutdown as normal operation may be resumed more quickly.

In addition to measuring the wind conditions at various distances, it is also desirable, though not essential, to correct the data obtained from the LIDAR to take into account axial induction and wind coherency. Although these corrections are not essential, failure to do so could result in a gust or other event being identified as extreme when it is not, and unnecessary evasive action being taken. This can result in unnecessary loss in production and financial loss to the operator. For example, the turbine would be commanded to stop over-rating which would reduce the energy output by the turbine.

Axial induction occurs in front of the rotor and is caused by a pressure build up in front of the rotor caused by the rotor. This tends to slow the airflow through the rotor and spreads the airflow radially outwards.

Wind coherency correction is required as a turbulent nature of wind causes the airflow to change as it moves from point to point. Thus, a gust detected at a distant range gate may change dramatically by the time the gust reaches the wind turbine. Coherency corrections may be based on data and models built up from multiple range gate measurements and may be specific to a given wind turbine as local conditions such as terrain may effect local coherency.

A controller which implements these corrections is illustrated in FIG. 6. This controller controls the turbines reaction to a detected extreme event and provides an output to the over-rating controller indicating whether or not an extreme event has been detected. The advancing wind field is indicated at 20 and the wind field is detected by a LIDAR 30, which in this case is a multiple range, multiple beam LIDAR. The LIDAR can output wind speed 32, wind direction 34, vertical wind shear 36 and horizontal wind shear 38 signals. These signals are first corrected for axial induction at 40 and then for coherency at 42 although the order of correction is not important. The corrected measurements are then converted into a time signal at 44 by applying a distanced time transfer function to provide corrected LIDAR signals which provide an input to an extreme event detection unit 46. This unit processes the LIDAR signals and, if an extreme event is detected which would result in an extreme load, the unit can output an extreme action trigger event. The extreme event detection unit can detect extreme wind speed 48, extreme operating gusts 50, extreme turbulence 52, extreme direction change 54 and extreme wind shear 56 and output a trigger signal on a respective output as shown in FIG. 6. The extreme output triggers form input to an extreme event action unit 60 which commands the turbine to take appropriate evasive action depending on the extreme trigger input. A given event may generate one or more triggers and the extreme action unit determines what action to take based on the type and number of triggers. Each extreme condition, combination of extreme conditions and level of extremity of each condition has a pre-determined course of action. This may, for example, be stored as a look-up table within the extreme event action unit 60.

Figure 7:
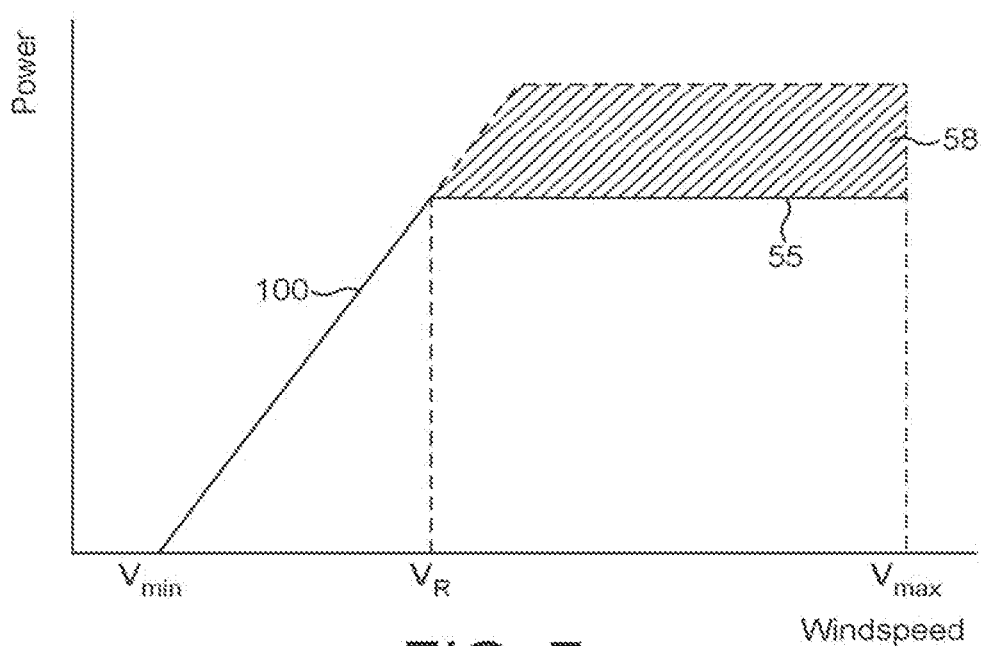
FIG. 7 shows a power curve for a wind turbine illustrating overrating.

The extreme event action unit 60 also has an output to the over-rating controller shown in FIG. 7. This output sends a signal to the over-rating controller when any extreme event is detected, thus enabling the over-rating controller to cease over-rating the turbine. The output to the over-rating controller may normally be held low and go high in the presence of a detected extreme event, or vice versa.

The extreme event action unit, as well as outputting an over-rating override signal 61, outputs one or both of a yaw angle command 64 or a power level demand 62. The demand signals are input as extreme event power level and extreme event yaw angle signals to a production control unit 70 which also receives as an input, turbine feedback signals 72 from the wind turbine and generates as outputs control system signals which are applied to the wind turbine 80 to control wind turbine parameters.

The yaw angle signal developed by the extreme event action unit 60 when applied as a control signal by the production control unit causes the wind turbine yaw drive to move the rotor out of the wind. The control signal has been developed in response to the advance detection of an extreme event and there is sufficient time for the yaw drive of the wind turbine to move the rotor out of the path of the incoming wind before it arrives at the turbine so that loading of the rotor caused by the extreme event is minimised and the damage is minimised.

The power level control signal developed by the extreme of an action unit 60 causes the generator power level to be changed from its normal operating set point to a level below normal operating conditions. The power level demand signal sent depends on the nature and severity of the extreme event, and may include the generator shutdown command in response to which the controller performs an emergency shutdown. This may involve opening the generator contacts and preventing the generation of power, so disconnecting the generator from the network to which it is attached.

Alternatively, the power level profile sent to the production control unit 70 may comprise a pitch reference which provides a new set point for the rotor blades to move to, so that the load on the blades is reduced when an extreme event reaches the wind turbine. A third power level provides a fresh power reference signal to reduce the power generated by the generator; and a fourth power level is a thrust limit signal. It is to be understood that this is not an exhaustive list of responses to the detection of an extreme event and that the controller responds to detection of an extreme event by taking appropriate action to minimise or avoid damage to the wind turbine components, as well as sending an over-rating override signal to the over-rating controller to prevent over-rating from occurring.

Although in some extreme events, generator shutdown is essential, it is possible to take less drastic action, as the action may be reversed more quickly when signals received from the LIDAR indicate that the extreme event has passed and normal operating set points may be resumed. The extreme event detector 46 processes the LIDAR signals to determine whether or not the signals represent an extreme event. Where the event desired to be detected is an extreme direction change, the LIDAR may be a multi-beam LIDAR having a plurality of look directions which detect the wind direction which may be expressed as an angle with respect to a known direction such as the angle of rotation of the wind turbine rotor. A differentiator differentiates the measured angle with respect of time to give a value $d\theta/dt$ where $\theta$ is the measured angle and a filter filters that signal over a predetermined period of time. A threshold detector receives the output from the filter, together with an indication of wind speed and determines whether the threshold has been exceeded. The threshold detector may include a look-up table of thresholds at different wind speeds. Alternatively, the extreme event detection unit may act on a wind velocity signal after axial induction correction and coherency correction and resolve that velocity into an axial velocity in the direction of the axis of rotation of the wind turbine rotor and a lateral velocity being the velocity in the plane of the rotor or normal to the axis of rotation. The differentiator acts on the lateral velocity to provide an output to the filter which is the lateral acceleration of the wind and, therefore, indicative of a direction of change.

In order to detect an extreme operating gust, the differentiator may act on the axial velocity signal which, as in the previous example, is filtered and an extreme event flagged if a threshold is exceeded.

It will be appreciated that the controller described is individual to a turbine and is a part of the on-board turbine controller. However, in a wind power plant, only certain turbines may be provided with LIDARs in view of the expense of these devices. In that case, the detection of a potential extreme event may be communicated to other turbines, for example through a power plant controller. It should be noted, however, that in unstable conditions of high turbulence an event may be extreme at one turbine but not extreme at adjacent turbines. The topography of the site may also affect local conditions. Individual detection of extreme events at each turbine is therefore preferable if economically feasible.

The manner in which over-rating may be implemented in a wind power plant will now be described. FIG. 7 shows the power curve 100 for a conventional wind turbine. In the Figure, wind speed is plotted on the X axis against power output on the Y axis. Curve 100 is the normal power curve for the wind turbine and defines the power output by the wind turbine generator as a function of wind speed. As is well known in the art, the wind turbine starts to generate power at a cut-in speed $v_{min}$. The turbine then operates under part load (also known as partial load) conditions until the rated wind speed is reached at point $v_r$. At the rated wind speed at $v_r$ the rated, nominal, generator power is reached and the turbine is operating under full load. The cut-in wind speed in a typical wind turbine is 3 m/s and the rated wind speed is 12 m/s. Point $v_{max}$ is the cut-out wind speed which is the highest wind speed at which the turbine may be operated under differing power. At wind speeds equal to and above the cut-out wind speed, the wind turbine is shut down for safety reasons, in particular, to reduce the loads acting on the wind turbine.

The rated wind power of a wind turbine is defined in IEC 64100-1 as the maximum continuous electrical power output which a wind turbine is designed to achieve under normal operating and external conditions. Therefore, a conventional wind turbine is designed to operate at the rated power so that the design loads of components are not exceeded and that the fatigue life of components is not exceeded.

As shown in FIG. 7, the turbine may be controlled such that it can produce more power than the rated power as indicated by the shaded area 102. When operated in this area, the turbine is "over-rated" which is understood to mean that it is producing more than the rated power during full load operation. When the turbine is over-rated the turbine is run more aggressively than normal and the generator has a power output which is higher than the rated power for a given wind speed.

Although over-rating is usually characterised by a transient behaviour, we have appreciated that a turbine may be over-rated for an extended period of time if the wind conditions and the fatigue life of the components are favourable to over-rating. The over-rating power level may be up to 30% above the rated power output.

Figure 8:
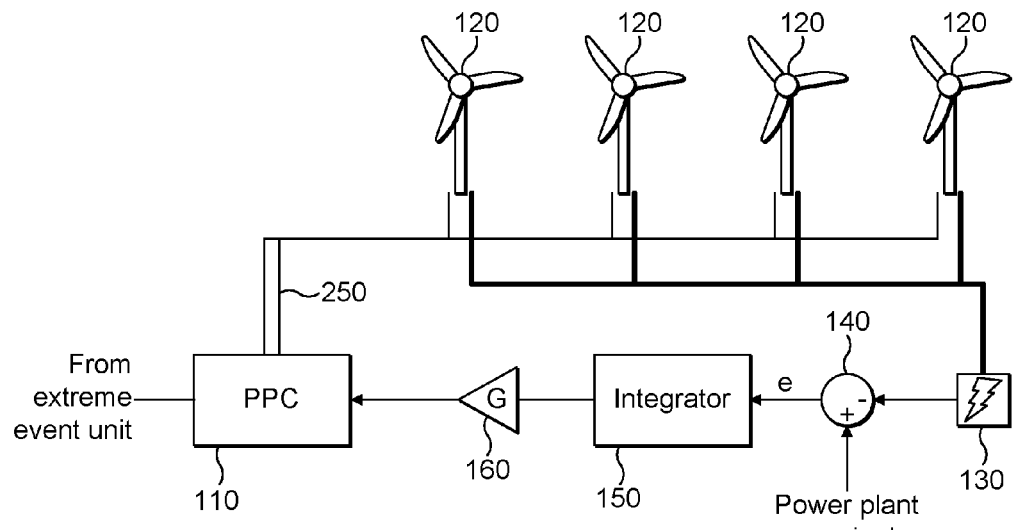
FIG. 8 shows a power plant controller providing overrating commands to the turbines of a wind power plant.

FIG. 8 shows a Power Plant Controller (PPC) 110 which controls a plurality of wind turbines 120 forming a wind power plant. The PPC 110 communicates with each of the turbines and can receive data, such as pitch angle, rotor speed, power output etc from the turbines and send commands to individual turbines, such as set points for pitch angle, rotor speed, power output etc. The PPC 110 also receives commands from the grid, for example, from the grid operator to boost or reduce active or reactive power in response to demand or a fault on the grid. In addition, each turbine has its own controller which is responsible for operation of the turbine and which communicates with PPC 110.

The PPC controller receives power output data from each of the turbines and is therefore aware of the active and reactive power output by each turbine and by the plant as a whole at the grid connection point 130. If required, the controller can receive an operating set point for the power plant as a whole and divide this among each of the turbines so that the output does not exceed the operator assigned set point. This power plant set point may be anywhere from zero up to the rated power output for the plant. The rated or nominal power output for the plant is the sum of the rated power outputs of the individual turbines in the plant. The power plant set point may even be above the rated power output of the plant, i.e., the whole plant is over-rated.

In FIG. 8, the power plant controller 110 receives a signal which is a measure of the difference between the total power plant output and the nominal power plant output. This difference is used to provide the basis for over-rating by individual turbines. In this embodiment, which is only one example, the actual output of the power plant is subtracted from the nominal or rated output of the power plant at subtractor 140. The difference, shown as error signal e in FIG. 8 is input to an integrator 150. The integrator includes in-built saturation which prevents integral wind-up which is well-known problem in controllers where a large change in the set point curve and the integral terms accumulate a significant error during the rise (wind-up), thus overshooting and continuing to increase as this accumulated error is offset by errors in the other direction.

The output from integrator 150 is input to an amplifier 160 which applies a fixed gain g which scales the integrator output to provide an over-rating amount which is then provided to the controller and sent by the controller to each of the turbines. In theory, only a single turbine may be over-rated, but it is possible to over-rate a plurality of the turbines, or to send the over-rating signal to all turbines. The over-rating signal sent to each turbine is not a fixed control, but an indication of the maximum amount of over-rating that each turbine may perform. Each turbine has an optimiser, which may be located at the turbine more centrally which determines whether the turbine can respond to the over-rating signal and, if so, by what amount. For example, where the optimiser determines that condition to the given turbine available and above rated wind speed, it may respond positively and the given turbine is over-rated. As the optimisers implement the over-rating signal, the power output rises and so the error signal produced by the subtractor 140 decreases. The integrator reaches equilibrium as the error either reaches zero or the integrator saturates.

Thus, an over-rating signal is generated which is indicative of the amount of over-rating that may be performed by turbines of the power plant as a whole. However, each turbine responds individually to the over-rating signal in accordance with its optimiser. If conditions are such that the total optimisation results in over-rating but threatens to exceed the power plant nominal output, the difference reduces and individual optimisers reduce the amount of over-rating applied.

Figure 9:
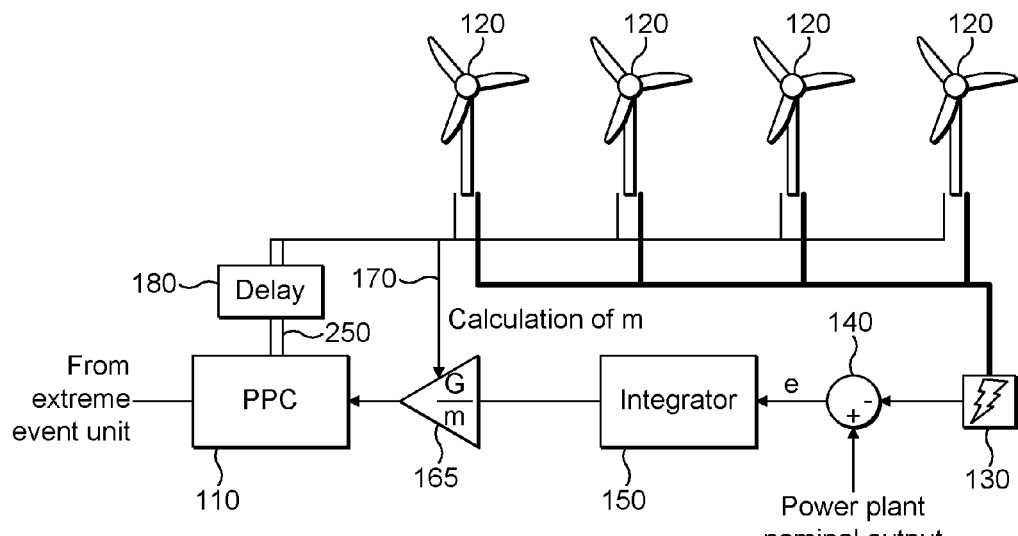
FIG. 9 shows a modified version of the system of FIG. 8.

FIG. 9 shows a modification of the FIG. 8 arrangement. In this Figure, account is taken of communications delays which may occur in a real power plant between the PPC 110 and the turbines 120. This is important as the over-rating signal is communicated from the PPC to the turbines. If the value tmG is too large, where t is delay time, m is the ratio of change in over-rating request to power plant output change and G is the basic feedback gain, the system overshoots, oscillates or becomes unstable. This value is the measure of the time taken for turbines to react to over-rating commands from the PPC 110. In order to ensure that tmG is maintained within an acceptable range, an upper band may be placed on tm when calculating the maximum feedback gain. However, this approach makes the controller slow to respond to changes in power plant output. This is undesirable when the output is too low and is unacceptable when the output is too high, as such an operation could lead to component damage.

The FIG. 9 arrangement overcomes this problem. Individual turbines are interrogated via their respective controllers by the PPC to calculate the value of m. In FIG. 9, the gain of the amplifier 165 is G/m and an input 170 is provided from the turbines 120 to the amplifier. The delay between the PPC and the turbines is illustrated as delay 180. Thus, the only parameter that is determined from the upper bound is t. This approach enables the controller to respond more quickly to changes in power plant output. In this example, as with the FIG. 8 example, the over-rating command sent to each turbine is the same.

The approach of FIG. 8 may be used where the delay between the controller and the turbines is negligible. In practice the delay will be determined by a number of factors, but proximity will play a large part. At present, commercially available PPCs can poll all turbines in a large power plant in about twenty seconds, but it is anticipated that this time will reduce to less than one second or even 10 s of milliseconds in the near future.

Figure 10:
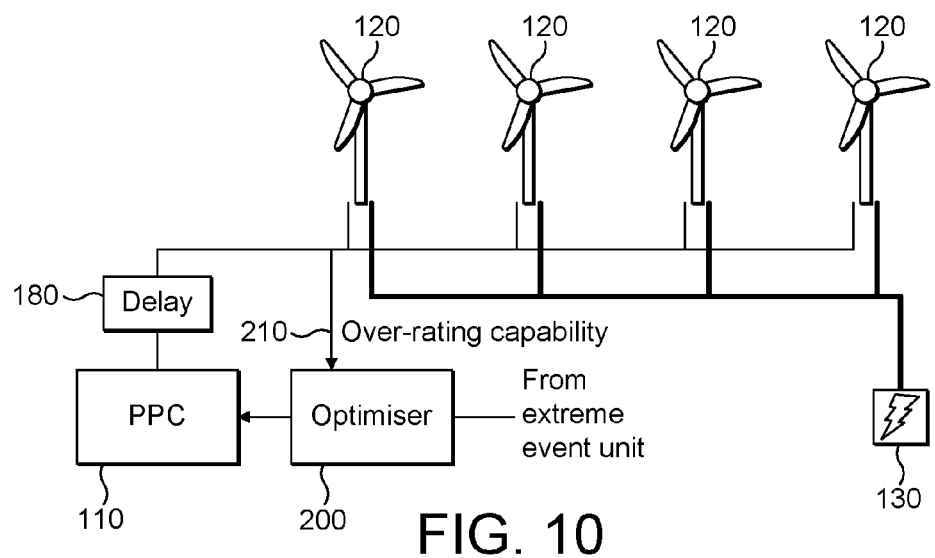
FIG. 10 shows a further modified version of the system of FIG. 8 incorporating a turbine optimiser.

In the previous two examples, the same over-rating set point signal is sent to each turbine using the total power plant output to provide a control input. In the embodiment of FIG. 10, each turbine is given its own over-rating amount. Thus, in FIG. 10 a central optimiser 200 provides an input into the PPC 110. The central optimiser receives an input 210 from each turbine which indicates the over-rating capacity of that turbine. That input depends on a variety of factors such as the local wind conditions, the present cost of electricity generated and the age or fatigue damage of the turbine and is provided by the individual turbine controller. The central optimiser 200 calculates an over-rating value for each turbine and communicates that value to each turbine based on the present over-rating capacity of the turbine. The PPC takes other factors into account, such as the need to ensure that the total output power does not exceed the rated output for the power plant. The optimiser bases its decisions on the effect of its action on the fatigue damage of the turbine components and, in FIG. 10, this is performed centrally for all turbines.

Thus, FIGS. 8-10 show how over-rating each turbine may be implemented via a power plant controller either by generating a common over-rating command for each turbine or by generating an individual over-rating command for each turbine.

In the example of FIG. 6, it was shown how an over-rating override signal could be produced if the extreme event detector detected an oncoming extreme event upwind to the turbine. This ensures that any over-rating commanded by the PPC is withdrawn so that the turbines are not over-rated when the extreme event arrives at the controller. In FIGS. 8 and 9, a single over-rating command is sent by the PPC to each of the turbines. In each of these Figures, PPC 110 includes an over-rate cancel command shown on line, which is sent to each of the turbines on receipt of the override signal from the extreme event action unit 60. In the FIG. 10 embodiment a central optimiser calculates over-rating values for each turbine. The optimiser receives the override signal from the extreme event action unit 60 and sets the over-rating amount for each turbine to be zero. This is communicated to the turbines via the PPC.

Alternatively, the PPC may receive the override signal and, in turn, override the over-rating signals from the optimiser.

In the examples of FIGS. 8-10, over-rating is controlled at the power plant level by the PPC. Alternatively, the over-rating may be performed on a per turbine basis, in which case the over-rating is determined by the local turbine controller. Again, this turbine controller receives the over-rating override signal from the extreme event action unit to prevent over-rating when there is an extreme event detected. In that case, the LIDAR which detects the extreme event is that of the turbine on which the over-rating is controlled.

In an alternative embodiment (not shown), it may be determined that it is unsafe to continue overrating at a present level but safe to continue to overrate at a lower level. In this case, instead of an override signal being received which prevents overrating, the received override signal may comprise an overrating reduction command. For example the overrating reduction command may be a new overrating set point which overrides the existing value.

It is not necessary for each turbine in a power plant to be provided with a LIDAR and extreme event detection apparatus. For example, only selected turbines may have LIDARs and extreme events detected by a given LIDAR may be used to suppress over-rating for a plurality of neighbouring turbines. In an array of turbines, LIDARs may be mounted only on selected peripheral turbines with the active LIDAR at any one time, depending on the wind direction with the active LIDARs being on the turbines which first meet the wind.

In one alternative embodiment, the remote sensing apparatus is not mounted on a wind turbine but on a structure or on the ground nearby. For example, the LIDAR may be placed in the order of 500-1000 m from the wind power plant in which case the LIDAR would be on the ground (if the wind power plant is not offshore) or mounted on a separate tower.

In the embodiments described, the extreme event detector has been described as part of the individual turbine controllers. It is possible, however, for the extreme event detector to be part of the PPC (the Power Park Controller).

Embodiments of the invention have the advantage that they turn over-rating for long periods of time from an option that is theoretically desirable to a practical option which can be implemented by wind power operators without having to worry about the impact of an extreme event hitting the wind power plant while one or more turbines are over-rating. In turn, this enables a wind power plant operator to increase greatly the revenue they can generate from a wind power plant under any given conditions.

Various modifications to the examples described are possible and will occur to those skilled in the art without departing from the scope of the invention which is defined by the following claims.

The invention claimed is:

1. A wind turbine, comprising:
   a remote sensing apparatus for sensing a wind parameter at a location remote from the wind turbine,
   a processor for processing the sensed wind parameter and outputting an override signal if the processing indicates that the wind parameter will exceed a predetermined value when the wind parameter arrives at the wind turbine, and
   a controller for controlling the output power of the wind turbine, the controller being configured to overrate the wind turbine, in response to sensed parameters, by operating the wind turbine at an output power greater that the rated power of the wind turbine, wherein the controller is further configured to receive the override signal from the processor and, on receipt of the override signal, to prevent or reduce overrating of the wind turbine.

2. A wind power plant comprising:
   a plurality of wind turbines, a remote sensing apparatus for sensing a wind parameter at a location remote from the wind power plant,
   a processor for processing the sensed wind parameter and outputting an override signal if the processing indicates that the wind parameter will exceed a predetermined value when the wind parameter arrives at the wind power plant, and
   a controller for controlling the power output of the plurality of wind turbines, the controller being configured to overrate at least some of the wind turbines, in response to sensed parameters, by operating the wind turbines at an output power greater than the rated power of the wind turbines, wherein the controller is further configured to receive the override signal from the processor and, on receipt of the override signal, to prevent or reduce overrating.

3. A wind turbine according to claim 1, wherein the remote sensing apparatus senses a plurality of wind parameters.

4. A wind turbine according to claim 1, wherein the sensed wind parameters are one or more of wind speed, wind turbulence, wind direction, vertical wind shear and horizontal wind shear.

5. A wind turbine according to claim 1, wherein the remote sensing apparatus is a LIDAR.

6. A wind turbine according to claim 1, wherein the LIDAR is a multiple range gate LIDAR.

7. A wind turbine according to claim 6, wherein the LIDAR is mounted to sense a wind parameter generally upstream of the wind turbine.

8. A wind turbine according to claim 6, wherein the LIDAR is mounted to scan around a generally vertical axis to sense a wind parameter.

9. A wind turbine according to claim 1, wherein the processor outputs the override signal if the processing indicates that the wind parameter will represent an extreme event as defined by IEC 64100-1 when the wind parameter arrives at the wind turbine.

10. A wind power plant according to claim 2, wherein on receipt of the override signal, the controller prevents overrating at one of the plurality of wind turbines from which the override signal was received.

11. A wind power plant according to claim 10, wherein on receipt of the override signal, the controller further prevents overrating at one or more further wind turbines of the plurality of wind turbines.

12. A control system for a wind turbine, comprising:
   a remote sensing apparatus for sensing a wind parameter at a location remote from the wind turbine,
   a processor for processing the sensed wind parameter and outputting an override signal if the processing indicates that the wind parameter will exceed a predetermined value when the wind parameter arrives at the wind turbine, and
   a controller for controlling the output power of the wind turbine, the controller being configured to overrate the wind turbine, in response to sensed parameters, by operating the wind turbine at an output power greater that the rated power of the wind turbine, wherein the controller is further configured to receive the override signal from the processor and, on receipt of the override signal, to prevent or reduce overrating of the wind turbine.

13. A control system for a wind power plant comprising a plurality of wind turbines, the control system comprising:

a remote sensing apparatus for sensing a wind parameter at a location remote from the wind power plant, a processor for processing the sensed wind parameter and outputting an override signal if the processing indicates that the wind parameter will exceed a predetermined value when the wind parameter arrives at the wind power plant, and a controller for controlling the power output of the plurality of wind turbines, the controller being configured to overrate at least some of the wind turbines, in response to sensed parameters, by operating the wind turbines at an output power greater than the rated power of the wind turbines, wherein the controller is further configured to receive the override signal from the processor and, on receipt of the override signal, to prevent or reduce overrating.

14. A method of controlling a wind turbine comprising:

sensing a wind parameter at a location remote from the wind turbine, processing the sensed wind parameter and outputting an override signal if the processing indicates that the wind parameter will exceed a predetermined value when the wind parameter arrives at the wind turbine, and controlling the output power of the wind turbine using a controller configured to overrate the wind turbine, in response to sensed parameters, by operating the wind turbine at an output power greater that the rated power of the wind turbine, the controller receiving the override signal from the processor and, on receipt of the override signal, preventing or reducing overrating of the wind turbine.

15. A method of controlling a wind power plant comprising a plurality of wind turbines, the method comprising:

sensing, using a remote sensing apparatus, a wind parameter at a location remote from the wind power plant, processing the sensed wind parameter and outputting an override signal if the processing indicates that the wind parameter will exceed a predetermined value when the wind parameter arrives at the wind power plant, and controlling the power output of the plurality of wind turbines using a controller configured to override at least some of the wind turbines, in response to sensed parameters, by operating the wind turbines at an output power greater than the rated power of the wind turbines, wherein the controller receives the override signal from the processor and, on receipt of the override signal, prevents or reduces overrating.

* * * * *